United States Patent
Maeda et al.

(10) Patent No.: US 9,465,338 B2
(45) Date of Patent: Oct. 11, 2016

(54) FIXING MEMBER, METHOD FOR MANUFACTURING THE SAME, FIXING APPARATUS, AND IMAGE FORMING APPARATUS

(71) Applicant: CANON KABUSHIKI KAISHA, Tokyo (JP)

(72) Inventors: Matsutaka Maeda, Kawasaki (JP); Katsuhisa Matsunaka, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 14/104,765

(22) Filed: Dec. 12, 2013

(65) Prior Publication Data
US 2014/0107250 A1   Apr. 17, 2014

Related U.S. Application Data

(63) Continuation of application No. PCT/JP2013/004481, filed on Jul. 23, 2013.

(30) Foreign Application Priority Data

Aug. 2, 2012   (JP) .................................. 2012-172116
Jun. 13, 2013   (JP) .................................. 2013-124881

(51) Int. Cl.
  *G03G 15/20*   (2006.01)
  *C08J 7/12*   (2006.01)
(52) U.S. Cl.
  CPC ............. *G03G 15/206* (2013.01); *C08J 7/123* (2013.01); *G03G 15/2057* (2013.01); *G03G 2215/2035* (2013.01)

(58) Field of Classification Search
  CPC ........... G03G 15/026; G03G 15/2057; G03G 15/2035; C08J 7/123
  See application file for complete search history.

(56) References Cited

U.S. PATENT DOCUMENTS 5,399,142 A   3/1995   Fukunaga
5,428,096 A   6/1995   Fukunaga
(Continued)

FOREIGN PATENT DOCUMENTS

EP   1 016 942 A2   7/2000
JP   6-250553 A   9/1994
(Continued)

OTHER PUBLICATIONS

International Preliminary Report on Patentability in Application No. PCT/JP2013/004481 (mailed Feb. 12, 2015).
(Continued)

*Primary Examiner* — Sanza McClendon
(74) *Attorney, Agent, or Firm* — Fitzpatrick, Cella, Harper & Scinto

(57) ABSTRACT

The present invention relates to a fixing member including a surface layer containing PFA, the fixing member being excellent in wear resistance and having high release properties to a toner. The fixing member includes a base member, an elastic layer provided on the surface of the base member, and a surface layer, wherein the surface layer contains a tetrafluoroethylene-perfluoroalkyl vinyl ether copolymer having a particular partial structure, and has a surface having a contact angle of 67 degrees or more as measured in a mixed liquid for a wetting tension test having a wetting tension of 31.0 mN/m.

15 Claims, 2 Drawing Sheets

(56) References Cited

U.S. PATENT DOCUMENTS

| | | |
|---|---|---|
| 8,351,837 B2 | 1/2013 | Kitano et al. |
| 8,909,119 B2 | 12/2014 | Miyahara et al. |
| 2010/0189943 A1 | 7/2010 | Qi et al. |
| 2014/0116599 A1 | 5/2014 | Miyahara et al. |
| 2014/0116603 A1 | 5/2014 | Akiyama et al. |
| 2014/0116611 A1 | 5/2014 | Akiyama et al. |
| 2014/0116612 A1 | 5/2014 | Akiyama et al. |
| 2014/0120352 A1 | 5/2014 | Miyahara et al. |
| 2014/0133892 A1 | 5/2014 | Miura et al. |

FOREIGN PATENT DOCUMENTS

| | | |
|---|---|---|
| JP | 2000-194220 A | 7/2000 |
| JP | 2002-023539 A | 1/2002 |
| JP | 2003-140494 A | 5/2003 |
| JP | 2003-156961 A | 5/2003 |
| JP | 2004-315833 A | 11/2004 |
| JP | 2007-047641 A | 2/2007 |
| JP | 2008-216639 A | 9/2008 |
| JP | 2010-176130 A | 8/2010 |
| JP | 2010-181621 A | 8/2010 |
| JP | 2011-158892 A | 8/2011 |
| JP | 2012-058644 A | 3/2012 |
| JP | 2012-118371 A | 6/2012 |

OTHER PUBLICATIONS

International Search Report in Application No. PCT/JP2013/004481 (mailed Sep. 24, 2013).
Akiyama et al., U.S. Appl. No. 14/063,229, filed Oct. 25, 2013.
Miyahara et al., U.S. Appl. No. 14/064,328, filed Oct. 28, 2013.
Miyahara et al., U.S. Appl. No. 14/064,335, filed Oct. 28, 2013.
Akiyama et al., U.S. Appl. No. 14/060,936, filed Oct. 23, 2013.
Akiyama et al., U.S. Appl. No. 14/063,224, filed Oct. 25, 2013.
Miyahara et al., U.S. Appl. No. 14/063,234, filed Oct. 25, 2013.
Miura et al., U.S. Appl. No. 14/158,098, filed Jan. 17, 2014.
Extended European Search Report in European Application No. 13826163.1 (dated May 13, 2016).
Oshima et al., U.S. Appl. No. 14/719,667, filed May 22, 2015.
Non-final Office Action in U.S. Appl. No. 14/719,667 (mailed Jun. 30, 2016).

FIXING MEMBER, METHOD FOR MANUFACTURING THE SAME, FIXING APPARATUS, AND IMAGE FORMING APPARATUS

CROSS-REFERENCE TO RELATED APPLICATIONS

This application is a continuation of International Application No. PCT/JP2013/004481, filed Jul. 23, 2013, which claims the benefit of Japanese Patent Application No. 2012-172116, filed Aug. 2, 2012, and Japanese Patent Application No. 2013-124881, filed Jun. 13, 2013.

BACKGROUND OF THE INVENTION

1. Field of the Invention

The present invention relates to a fixing member for use in a heat fixing apparatus of an electrophotographic image forming apparatus, a method for manufacturing the same, a fixing apparatus, and an image forming apparatus.

2. Related Background Art

A fixing member for use in a heat fixing apparatus of an electrophotographic image forming apparatus such as a printer, a copier, and a facsimile includes a film-shaped member and a roller-shaped member. As such a fixing member, a fixing member is known in which an elastic layer made of a heat resistant rubber or the like is, if necessary, formed on a film- or a roller-shaped base member made of a heat resistant resin or a metal, and a surface layer contains a fluororesin having excellent release properties to a toner. Herein, a tetrafluoroethylene-perfluoroalkyl vinyl ether copolymer (PFA) excellent in heat resistance can be used as the fluororesin contained in the surface layer.

By the way, in association with an increase in printing speed in recent years, the fixing member tends to be demanded to have more increased durability. Therefore, in order to increase the durability of the fixing member, many studies for enhancing the wear resistance of the fluororesin layer have been made.

Then, Japanese Patent Application Laid-Open No. 2010-181621, which describes the invention relating to a non-rotating pressure member to be arranged on a fixing unit of an image forming apparatus of an electrophotographic system, discloses that wear resistance of a crosslinked fluororesin layer formed through the following steps 1 to 4 is remarkably enhanced:
step 1: forming an unfired and uncrosslinked fluororesin layer on a base member,
step 2: heating the fluororesin layer to a temperature ranging from the melting point (Tm) of the fluororesin to a temperature higher than the melting point by 150° C. (Tm+150° C.), and firing the resultant,
step 3: adjusting the temperature of the fired uncrosslinked fluororesin layer within the range from a temperature lower than the melting point of the fluororesin by 50° C. (Tm−50° C.) to a temperature higher than the melting point by 50° C. (Tm+50° C.), and
step 4: irradiating the uncrosslinked fluororesin layer, the temperature of the layer being adjusted, with radiation having an irradiation dose ranging from 1 to 1000 kGy under an atmosphere having an oxygen concentration of 0.1 to 1000 ppm to crosslink the uncrosslinked fluororesin.

Then, in Japanese Patent Application Laid-Open No. 2010-181621, specific examples of the fluororesin include polytetrafluoroethylene (PTFE), a tetrafluoroethylene-perfluoroalkyl vinyl ether copolymer (PFA), and a tetrafluoroethylene-hexafluoropropylene copolymer (FEP).

SUMMARY OF THE INVENTION

Then, the present inventors have focused on PFA as a fluororesin, which has a low melt viscosity and is easily handleable as compared with PTFE, and have applied a method for irradiating a surface layer containing PFA with ionizing radiation while the surface layer being heated to the vicinity of the melting point of PFA in the absence of oxygen, based on the disclosure of PTL 1 Japanese Patent Application Laid-Open No. 2010-181621. As a result, the present inventors have found that while the wear resistance of the surface layer is certainly enhanced, release properties of a toner on the surface of the surface layer may be deteriorated.

Accordingly, the present invention is directed to providing a fixing member comprising a surface layer containing PFA, the fixing member being excellent in wear resistance and having high release properties to a toner.

Further, the present invention is directed to providing a method for manufacturing a fixing member comprising a surface layer containing PFA, the fixing member being excellent in wear resistance and having high release properties to a toner.

Furthermore, the present invention is directed to providing a fixing apparatus and an image forming apparatus that serve to stably form a high quality electrophotographic image.

According to one aspect of the present invention, there is provided a fixing member including a base member, an elastic layer provided on the surface of the base member, and a surface layer provided on the surface of the elastic layer, wherein the surface layer contains a tetrafluoroethylene-perfluoroalkyl vinyl ether copolymer having a partial structure represented by the following structural formula (1), and has a surface having a contact angle of 67° or more as measured in a mixed liquid for a wetting tension test having a wetting tension of 31.0 mN/m.

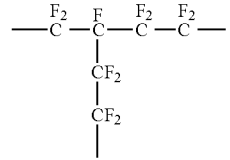

structural formula (1)

According to another aspect of the present invention, there is provided a fixing apparatus including the fixing member, a heating device of the fixing member, and a pressure member arranged opposite to the fixing member.

According to further aspect of the present invention, there is provided an image forming apparatus provided with the fixing apparatus.

According to still further aspect of the present invention, there is provided a method for manufacturing a fixing member including a base member, an elastic layer provided on the surface of the base member, and a surface layer containing a tetrafluoroethylene-perfluoroalkyl vinyl ether copolymer having a partial structure represented by the following structural formula (1), the method comprising a step of forming the surface layer by the following steps (1) to (3):

(1) adjusting the temperature of a film containing a tetrafluoroethylene-perfluoroalkyl vinyl ether copolymer within the temperature range of the glass transition point (Tg) of the tetrafluoroethylene-perfluoroalkyl vinyl ether copolymer or higher, and a temperature which is higher than the Tm of the tetrafluoroethylene-perfluoroalkyl vinyl ether copolymer (Tm) by 30° C., Tm+30° C., or lower,
(2) irradiating the surface of the film containing the tetrafluoroethylene-perfluoroalkyl vinyl ether copolymer, the temperature of which is within the temperature range adjusted in the step (1), with ionizing radiation under an atmosphere having an oxygen concentration of 1000 ppm or less to form a partial structure represented by the following structural formula (1) in the tetrafluoroethylene-perfluoroalkyl vinyl ether copolymer in the resin layer, and
(3) adjusting the temperature of the film containing the tetrafluoroethylene-perfluoroalkyl vinyl ether copolymer having the partial structure represented by the following structural formula (1), resulting from the step (2), within the range of 340° C. or higher and 380° C. or lower.

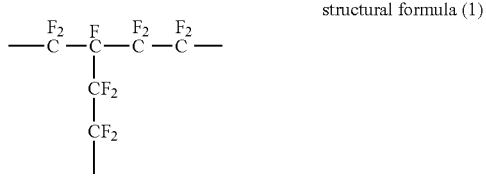

structural formula (1)

The present invention can achieve a fixing member that has a high wear resistance and that is excellent in toner release properties of the surface thereof. In addition, the present invention can achieve a fixing apparatus and an image forming apparatus that serve to stably provide a high quality electrophotographic image.

Further features of the present invention will become apparent from the following description of exemplary embodiments with reference to the attached drawings.

DESCRIPTION OF THE EMBODIMENTS

The present inventors consider the cause of deterioration in toner release properties of the surface of a film containing an uncrosslinked tetrafluoroethylene-perfluoroalkyl vinyl ether copolymer (PFA) in the case where the film is subjected to crosslinking of PFA according to the method described in Japanese Patent Application Laid-Open No. 2010-181621, as follows.

That is, in the case where PFA in the melted state is irradiated with electron beam or the like, for example, a linkage of a branched moiety of perfluoroalkyl vinyl ether in PFA, represented by the following structural formula (2), is considered to be particularly easily cleaved. As a result, it has been presumed that a low molecular weight component is generated in the film and the low molecular weight component is present on the surface of the film to thereby increase the surface energy of the film in which PFA is crosslinked by irradiation of ionizing radiation.

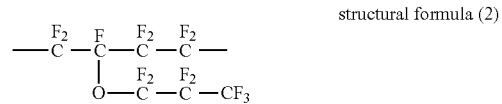

structural formula (2)

Based on such presumption, the present inventors have considered the following: if the low molecular weight component in the film can be moved from the surface to the interior of the film, the surface energy of the film can be reduced to enhance the toner release properties of the surface of the film.

Then, the present inventors have adjusted the temperature of a film containing PFA, obtained by irradiation with ionizing radiation to form a partial structure (crosslinked structure) represented by the following structural formula (1), to a temperature equal to or higher than the melting point of PFA having the crosslinked structure, and have left the film in the substantially melted state for a predetermined period. As a result, the present inventors have found that the surface energy of the film can be considerably reduced.

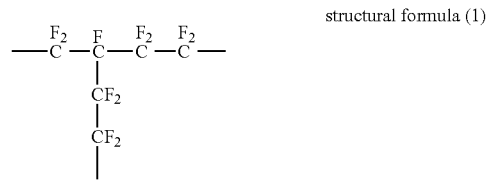

structural formula (1)

The reason for this is considered as follows: PFA in the film is left in the substantially melted state for a predetermined period to thereby increase fluidity of a molecular chain of PFA, allowing the component in the film to be rearranged in the direction of minimizing the surface energy of the film.

Hereinafter, a fixing member according to the present invention and a method for manufacturing the same will be specifically described.

(Configuration of Fixing Apparatus)

Figure 2:
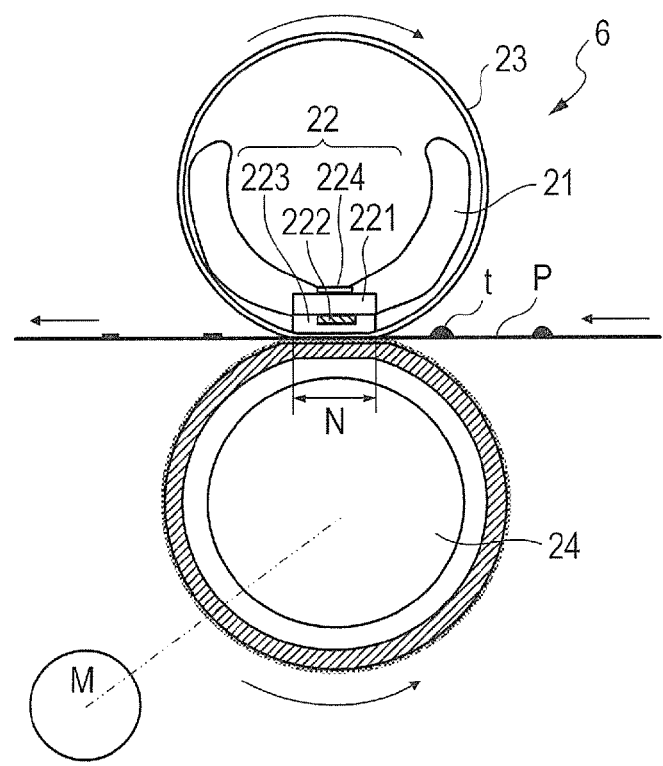
FIG. 2 is a schematic cross-sectional side configuration view of a fixing apparatus according to the present invention.

In the following description, with respect to a fixing apparatus and a member for constituting the fixing apparatus, the longitudinal direction means a direction perpendicular to the direction of conveying a recording material on the surface of the recording material. The lateral direction means a direction parallel to the direction of conveying a recording material on the surface of the recording material. The width means a dimension in the lateral direction. FIG. 2 is a schematic cross-sectional side configuration view of a fixing apparatus 6 having the fixing member according to the present invention. The fixing apparatus 6 is a fixing apparatus of a film heating system.

Reference numeral 21 denotes a film guide formed in a tub-like shape having a substantially semicircular arch-shaped cross section. The film guide 21 is a horizontally long member with the direction perpendicular to the drawing being defined as the longitudinal direction. Reference numeral 22 denotes a heating element accommodated in and supported by a groove formed along the longitudinal direction at the substantially center on the lower surface of the film guide 21.

Reference numeral 23 denotes the fixing member according to the present invention, wherein the fixing member has an endless belt-like (cylinder-like) shape. The fixing member 23 is loosely engaged externally with the guide 21 by which the heating element 22 is supported. A material for the guide 21 is a molded product of a heat resistant resin such as PPS (polyphenylene sulfide) or a liquid crystal polymer.

The heating element 22 constituting a heating device of the fixing member is a ceramic heater that entirely has a low heat capacity and that is elongated in the longitudinal direction. The heater 22 has a thin plate-like alumina heater plate 221 that is elongated in the longitudinal direction. An electric heat generator (resistance heat generator) 222 made of a linear or strip-like Ag/Pd or the like is formed on the surface (surface at a nip portion N side, described later) of the heater plate 221 along the longitudinal direction of the heater plate 221. The electric heat generator 222 is protected by a surface protective layer 223 formed by a thin glass layer or the like so as to cover the electric heat generator 222. A temperature detection element 224 as a temperature sensing member, such as thermistor, or the like is provided on the back surface (surface opposite to the surface at a nip portion N side) of the heater plate 221.

Reference numeral 24 denotes a pressure roller as a pressure member. The pressure roller 24 is arranged under the fixing member 23 so as to be opposite to the fixing member 23. The pressure roller 24 is pressed against the heater 22 at a predetermined pressurizing force by a predetermined pressure mechanism (not illustrated) with the fixing member 23 being sandwiched. The outer periphery surface (surface) of the pressure roller 24 is brought into contact with the outer periphery surface (surface) of the fixing member 23 according to the pressurizing force, and the pressure roller 24 is elastically deformed. Thus, a nip portion N (fixing nip portion) having a predetermined width is formed between the surface of the pressure roller 24 and the surface of the fixing member 23.

(Configuration of Fixing Member)

Figure 3:
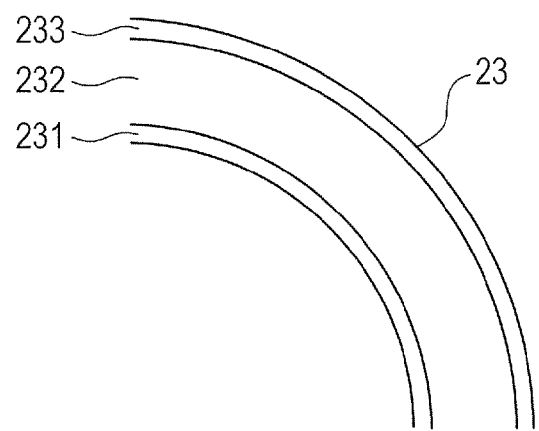
FIG. 3 is a schematic cross-sectional configuration view of a fixing member according to the present invention.

FIG. 3 is a partial cross-sectional view of the fixing member 23. In FIG. 3, reference numeral 231 denotes a base member, reference numeral 232 denotes an elastic layer, and reference numeral 233 denotes a surface layer.

<Base Member>

As a material for the base member, a resin material such as polyimide (PI), polyamidimide (PAI), polyether ether ketone (PEEK), or polyethersulfone (PES), or a metal material such as stainless or nickel can be used. The thickness of the base member can be 20 to 100 μm, in particular, 20 to 60 μm in order to reduce heat capacity and enhance quick starting ability as the fixing apparatus.

<Elastic Layer>

As a material for the elastic layer 232, a known elastic material can be used and, for example, a silicone rubber, a fluoro-rubber or the like is used.

<Surface Layer>

The surface layer 233 contains PFA (tetrafluoroethylene-perfluoroalkyl vinyl ether copolymer) having the partial structure represented by the structural formula (1), namely, a crosslinked part. The surface of the surface layer 233 has a static contact angle of 67 degrees or more with respect to a mixed liquid for a wetting tension test having a wetting tension of 31.0 mN/m. Herein, the value of the static contact angle, 67 degrees, is a general value as the value which the fixing member having a stable surface has, on which the adhesion of a toner or the like is suppressed. However, the present inventors recognize that there has heretofore been no surface layer having a stable surface, which contains crosslinked PFA and has a static contact angle of at least 67 degrees.

Herein, the upper limit of the contact angle of the surface layer according to the present invention is not particularly limited, but is about 74 degrees in fact.

Herein, the static contact angle according to the present invention was measured using a mixed liquid for a wetting tension test having a wetting tension of 31.0 mN/m. A full automatic contact angle meter (product name: DM-500, produced by Kyowa Interface Science Co., Ltd.) was used as a measurement apparatus, and the amount of a mixed liquid for a wetting tension test to be dropped to a surface to be measured was set to 1.2 μl. In addition, an arithmetic mean value of 5 to 7 measurement values was defined as the value of the contact angle according to the present invention.

(Method for Manufacturing Fixing Member)

Hereinafter, a method for manufacturing the fixing member according to the present invention will be specifically described.

That is, the fixing member according to the present invention includes a base member, an elastic layer provided on the surface of the base member, and a surface layer containing a tetrafluoroethylene-perfluoroalkyl vinyl ether copolymer having a partial structure represented by the structural formula (1).

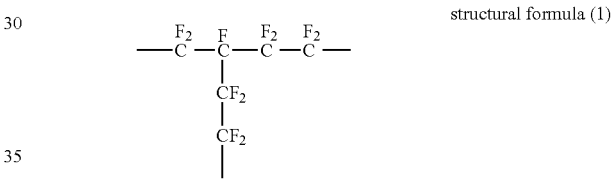

Then, a method for manufacturing such a fixing member includes forming a surface layer including the following first to third steps:

(1) a first step of adjusting the temperature of a film containing an uncrosslinked tetrafluoroethylene-perfluoroalkyl vinyl ether copolymer (hereinafter, "tetrafluoroethylene-perfluoroalkyl vinyl ether copolymer" is abbreviated as "PFA"), formed on the surface of the elastic layer, within the temperature range of the glass transition point (Tg) of the PFA or higher and a temperature higher than the Tm of the PFA by 30° C. (Tm+30° C.) or lower, (2) a second step of irradiating the surface of the film containing the PFA, the temperature of the film falling within the range adjusted in the first step, with ionizing radiation under an atmosphere having an oxygen concentration of 1000 ppm or less to form a partial structure represented by the structural formula (1) in PFA in the film, and (3) a third step of adjusting the temperature of the film containing PFA having the partial structure represented by the structural formula (1), the film being obtained in the second step, within the temperature range of 340° C. or higher and 380° C. or lower.

Hereinafter, the respective steps will be described in detail.

First Step

First, a film containing uncrosslinked PFA is formed on the surface of an elastic layer. Then, the temperature of the film is adjusted within the temperature range of the glass transition point (Tg) of uncrosslinked PFA or higher and a temperature higher than the melting point (Tm) of the PFA by 30° C. (Tm+30° C.) or lower.

Herein, while PFA being a fluororesin for use as a main material of a surface layer of the present invention has a heat resistance comparable with the heat resistance of polytetrafluoroethylene (hereinafter, abbreviated as "PTFE"), PFA has a low melt viscosity as compared with PTFE. Therefore, PFA is excellent in processability and smoothness.

While the melting point of PFA slightly varies depending on the polymerization ratio of perfluoroalkyl vinyl ether, the degree of polymerization of PFA, and the like, the melting point of PFA generally ranges from 300° C. to 310° C.

Many fluororesins including PFA are decomposition-type resins in which only a decomposition reaction occurs by irradiation with ionizing radiation under ordinary temperature. However, it is well known with respect to, in particular, PTFE that if such a resin is irradiated with ionizing radiation in the state of being heated to the vicinity of the melting point, a crosslinking reaction mainly occurs rather than a decomposition reaction to crosslink molecular chains, leading to the enhancement in wear resistance.

According to studies by the present inventors in this time, it has been found that even if PFA is not heated to the vicinity of the melting point, PFA is heated to the glass transition point or higher to allow a crosslinking reaction to sufficiently occur to enhance wear resistance. In the case of PTFE, it is necessary for crosslinking PTFE having a molecular structure which is rigid and close to a single chain that PTFE is heated to the vicinity of the melting point to thereby melt crystals of PTFE and irradiated with ionizing radiation in the state where molecular chains easily move. However, unlike PTFE, PFA has a flexible amorphous part because of having a side chain and the amorphous part can flexibly move at the glass transition point (Tg) or higher, and it is thus considered that PFA can be crosslinked by irradiation with ionizing radiation at the glass transition point (Tg) or higher. Therefore, the temperature of the film containing uncrosslinked PFA to be subjected to an ionizing radiation irradiation step as a second step described later can be the glass transition point (Tg) of PFA or higher.

On the other hand, if the temperature of uncrosslinked PFA is made too higher than the melting point of uncrosslinked PFA, the decomposition reaction of PFA predominantly occurs. Then, the temperature of the film containing uncrosslinked PFA to be subjected to an ionizing radiation irradiation step as a second step described later can be set to a temperature higher than the melting point of uncrosslinked PFA by 30° C. (Tm+30° C.) or lower, in particular, a temperature lower than the melting point of uncrosslinked PFA by 60° C. (Tm−60° C.) or lower.

The melting point is herein defined as a crystalline melting point to be detected as a melting peak upon the rise in temperature at a rate of temperature rise of 20° C./min using a differential scanning calorimeter (DSC).

In addition, the glass transition point is herein defined as a glass transition point by a peak at the inflection point of tan δ as measured using a dynamic viscoelasticity measurement apparatus (DMA) at a frequency of 10 Hz and at a rate of temperature rise of 5° C./min.

Herein, examples of a method for forming a film containing an uncrosslinked PFA resin on the surface of the elastic layer include the following methods (1) to (3).

(1) A dispersion in which particles made of uncrosslinked PFA (hereinafter, also referred to as "uncrosslinked PFA particles") are colloidally dispersed in an aqueous solvent is applied by a known method, for example, spray coating or dip coating, to form a coating film of the dispersion. Then, the temperature of the coating film is adjusted to the melting point of uncrosslinked PFA or higher to melt the uncrosslinked PFA particles, forming a film containing uncrosslinked PFA.

(2) A powder coating material is allowed to adhere to the surface of the elastic layer by electrostatic painting. Then, the temperature of the coating film is adjusted to the melting point of uncrosslinked PFA or higher to melt the uncrosslinked PFA particles, forming a film containing uncrosslinked PFA.

(3) A tube containing uncrosslinked PFA (hereinafter, also referred to as "uncrosslinked PFA tube")) is produced by extrusion molding. The uncrosslinked PFA tube covers the circumference of the elastic layer to thereby form a film containing uncrosslinked PFA on the surface of the elastic layer.

Second Step

The present step is a step of irradiating the surface of the film containing uncrosslinked PFA, the temperature of the film falling within the range adjusted in the first step, with ionizing radiation under an atmosphere having an oxygen concentration of 1000 ppm or less to form a partial structure represented by the structural formula (1) in PFA.

The ionizing radiation for use in the present step includes γ-ray, electron beam, X-ray, neutron ray, or high-energy ion. In particular, electron beam can be used in terms of general-purpose properties of an apparatus.

The target of the irradiation dose of the radiation may be appropriately selected within the range from 1 to 1000 kGy, in particular, from 200 to 600 kGy as a dose required for forming a crosslinked structure represented by the structural formula (1) in uncrosslinked PFA. The irradiation dose can be set within the above range to thereby suppress the reduction in weight of PFA due to volatilization of a low molecular weight component generated by cleaving a molecular chain of PFA.

The irradiation with ionizing radiation according to the present step is required for irradiating the film containing uncrosslinked PFA under an atmosphere having substantially no oxygen. A specific atmosphere can be an atmosphere having an oxygen concentration of 1000 ppm or less. The irradiation may be performed under a vacuum atmosphere or under an atmosphere of an inert gas such as nitrogen or argon as long as the atmosphere has an oxygen concentration of 1000 ppm or less. The irradiation can be performed under a nitrogen atmosphere in terms of cost.

Third Step

In the present step, the film containing PFA having the partial structure represented by the structural formula (1), namely, the crosslinked structure, obtained in the second step, is further adjusted so as to have a temperature within the range from 340 to 380° C. The third step may be performed under a nitrogen atmosphere successively in the apparatus in which the second step has been performed, or may be performed in air. The film subjected to the second step may be again heated to a temperature within the range from 340 to 380° C. after being cooled to ordinary temperature once.

The third step can be performed to thereby improve toner release properties of the surface of the film containing crosslinked PFA after irradiation with ionizing radiation.

It is considered that the deterioration in toner release properties of the surface of the film whose temperature is adjusted to the vicinity of the melting point of uncrosslinked PFA and which is obtained after irradiating of the film containing uncrosslinked PFA with ionizing radiation is due to generation of a high surface energy component along with decomposition of a perfluoroalkyl vinyl ether group in PFA. Then, it is considered that the temperature of the film containing crosslinked PFA is adjusted within the range of the melting point of crosslinked PFA or higher in the present step to thereby increase fluidity of a molecular chain of crosslinked PFA to promote molecular rearrangement so that the surface energy is minimized. It is considered that, as a result, the high surface energy component in the film containing crosslinked PFA moves to the inside of the film and crosslinked PFA having low surface energy moves to the surface to thereby recover the toner release properties of the film, once deteriorated.

The temperature range from 340 to 380° C. of the film containing crosslinked PFA in the present step is considered to be a temperature range in which crystals of crosslinked PFA sufficiently flow and decomposition of crosslinked PFA does not substantially occur.

In the present step, the film containing crosslinked PFA can be maintained in the temperature range from 340 to 380° C. for 5 minutes or more, in particular, for 10 minutes or more. Thus, a crosslinked PFA molecule easily flows, and sufficiently reduced surface energy is achieved. The upper target period for which the film is maintained within the temperature range can be 20 minutes or less.

(Configuration of Entire Image Forming Apparatus)

Figure 1:
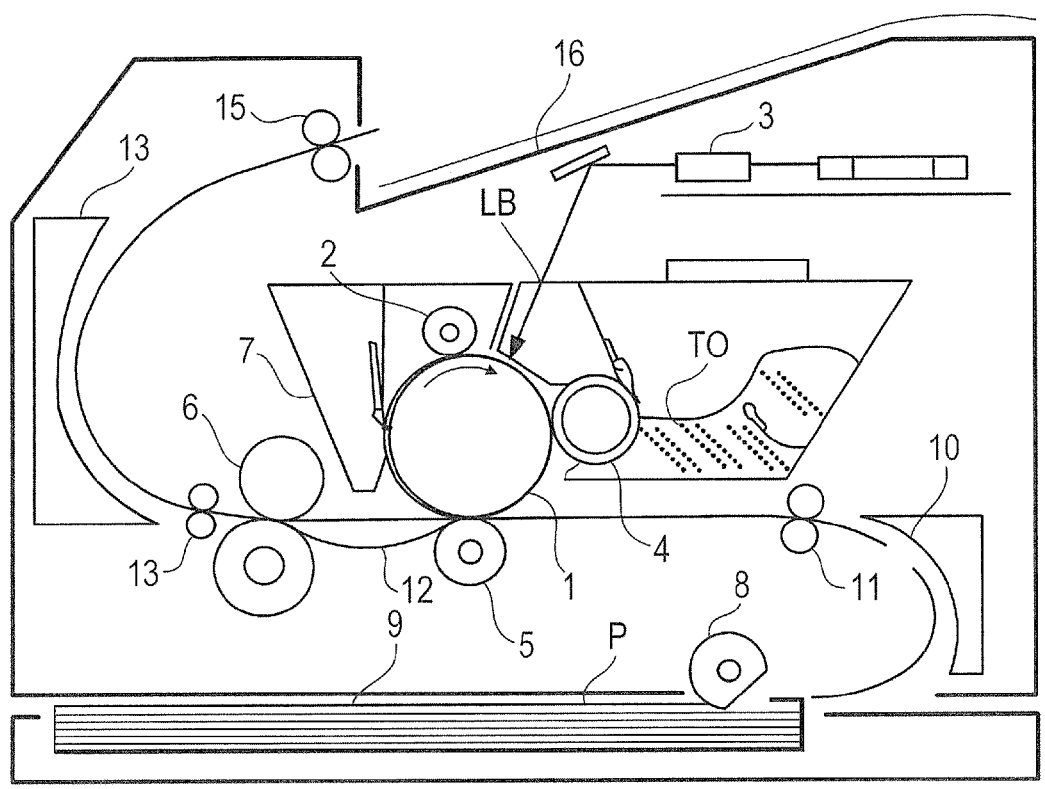
FIG. 1 is a schematic outline configuration view of one example of an image forming apparatus.

FIG. 1 is a schematic outline configuration view of one example of an image forming apparatus on which an image heating device according to the present invention is mounted as a fixing apparatus (fixer). The image forming apparatus is a laser beam printer of an electrophotographic system (hereinafter, designated as "printer").

The printer illustrated in FIG. 1 has a rotating drum type electrophotographic photosensitive member (hereinafter, designated as "photosensitive drum") 1 as an image carrying member.

The photosensitive drum 1 is rotated in an arrow direction at a predetermined circumferential velocity (process speed) in response to a print signal. Then, the outer periphery surface (surface) of the photosensitive drum 1 is evenly charged by a charging roller 2 as a charging unit to have a predetermined polarity and potential in the course of the rotation. The evenly charged surface on the surface of the photosensitive drum 1 is scan-exposed by laser beam LB that is output from a laser beam scanner 3 and modulation controlled (ON/OFF control) according to image information. Thus, an electrostatic latent image according to object image information is formed on the surface of the photosensitive drum 1. The latent image is developed and visualized as a toner image using a toner TO by a developing apparatus 4 as a developing unit.

On the other hand, recording materials P loaded and put in a feeding cassette 9 are supplied one by one by driving a feeding roller 8, pass through a sheet path having a guide 10, and are conveyed to a resist roller 11. The resist roller 11 feeds the recording materials P to a transfer nip portion between the surface of the photosensitive drum 1 and the outer periphery surface (surface) of a transfer roller 5 at predetermined control timing. The recording materials P are each conveyed while being sandwiched by the transfer nip portion, and in the course of the conveying, the toner image on the surface of the photosensitive drum 1 is sequentially transferred on the surface of each of the recording materials P by transfer bias applied to the transfer roller 5. The recording materials P thus carry an unfixed toner image.

The recording materials P carrying an unfixed toner image (unfixed image) are sequentially separated from the surface of the photosensitive drum 1 and discharged from the transfer nip portion, and pass through a conveying guide 12 and are introduced to a nip portion of a fixing apparatus 6. Heat and pressure are applied to the recording materials P at the nip portion of the fixing apparatus 6 to thereby allow the toner image to be heat fixed on the surface of each of the recording materials P. The recording materials P exiting the fixing apparatus 6 pass through a sheet path having a conveying roller 13, a guide 14 and a discharging roller 15, and are discharged to a discharging tray 16. In addition, the surface of the photosensitive drum 1, from which the recording materials are separated, is subjected to a treatment for removing adhering contamination such as a residual transfer toner by a cleaning apparatus 7 as a cleaning unit and cleaned, and repeatedly subjected to image forming.

(Heat Fixing Operation of Fixing Apparatus)

If a fixing motor M as a driving source is rotation-driven in response to a print signal, the rotation force of the fixing motor M is transmitted to a pressure roller 24 via a driving force transmission mechanism (not illustrated). The pressure roller 24 is thereby rotated in an arrow direction at a predetermined circumferential velocity (process speed). The rotation of the pressure roller 24 is transmitted to the surface of a fixing film 23 via a nip portion N, and the fixing film 23 rotates in an arrow direction while being driven together with the rotation of the pressure roller 24.

EXAMPLES

Hereinafter, the present invention will be more specifically described with reference to Examples. It is to be noted that while the Examples are examples of an embodiment to which the present invention can be applied, the present invention is not limited only to the Examples and can be variously modified within the spirit of the present invention.

Example 1

A stainless film having an outer diameter of 30 mm, a thickness of 40 μm, and a length in the axial direction of 400 mm was prepared as a base member of a fixing film.

A liquid silicone rubber mixture containing an addition-curable silicone rubber (product name: XE15-B9236, produced by Momentive Performance Materials Japan LLC) was applied on the stainless film by using a ring-shaped coating head to form a coating film of the liquid silicone rubber mixture. The coating film had a thickness of 300 μm. Then, the coating film was heated to 200° C. to react the addition-curable silicone rubber in the coating film, thereby forming an elastic layer containing a silicone rubber.

Then, the surface of the elastic layer was treated with excimer UV, then uniformly spray-coated with a primer (product name: EK-1909S21L, produced by Daikin Industries, Ltd.) so that the thickness was 2 μm, and dried.

Then, the resultant was spray-coated with an aqueous dispersion coating material of PFA particles (product name: AW-5000L, produced by Daikin Industries, Ltd., melting point: 300° C., glass transition point: 90° C.) so that the thickness after firing was 25 μm, to form a coating film, in which PFA particles were dispersed, so that the thickness was 50 μm. The coating film was heated to 350° C. and maintained at the temperature for 15 minutes to melt the PFA particles in the coating film, forming a film made of an uncrosslinked PFA resin.

(First Step)

The stainless film in which the elastic layer and the film made of an uncrosslinked PFA resin, formed on the surface of the elastic layer, were thus laminated in this order was placed in a heating furnace having an oxygen concentration of 1000 ppm or less, and the temperature of the film made of an uncrosslinked PFA resin was set to 310° C.

(Second Step)

The surface of the PFA resin film having a temperature of 310° C. by the first step was irradiated with electron beam so that the irradiation dose was 200 kGy.

(Third Step)

After the completion of irradiation with electron beam, the stainless film was taken out from the heating furnace and placed in another heating furnace having an air atmosphere, and the PFA resin film was heated to 350° C. under an air atmosphere and maintained at the temperature for 15 minutes to provide a fixing film according to the present invention. Then, the fixing film was subjected to Evaluation 1 to Evaluation 4 described later.

<Evaluation 1> Analysis of Crosslinked Structure in PFA Resin Obtained in Second Step The presence of a structure represented by the structural formula (1) in the PFA resin can be confirmed, with respect to the presence of the crosslinked structure, by nuclear magnetic resonance spectroscopy using a fluorine nucleus (19F-NMR). Fluororesins are insoluble in any solvent, and thus are measured in the solid state. PFA is known to have a linear main chain and not to have a branched structure other than a side chain portion as represented by the following structural formula (2).

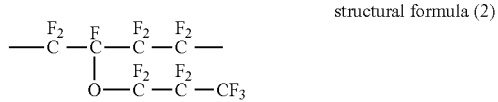

structural formula (2)

If uncrosslinked PFA heated to the vicinity of the melting point under a low oxygen atmosphere is irradiated with electron beam, a molecular chain of PFA is cleaved and crosslinked to newly form a branched structure as represented by the following structural formula (1).

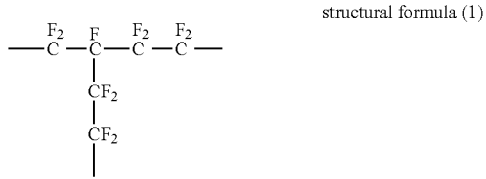

structural formula (1)

Fluorine on carbon adjacent to tertiary carbon newly formed in the thus newly formed partial structure represented by the structural formula (1) has a peak near −103 ppm in a 19F-NMR spectrum. Accordingly, it can be confirmed by the appearance of such a new peak near −103 ppm (peak of crosslinking point) in the 19F-NMR spectrum that the partial structure represented by the structural formula (1) is present in PFA, and the presence of the crosslinked structure can be determined. In addition, the measurement temperature in this time is 250° C., and a peak value is determined using hexafluorinated benzene as an external standard.

In Example 1, in order to confirm that the partial structure represented by the structural formula (1) is formed in the PFA molecule in the surface layer of the fixing film obtained through the second step, a part of the surface layer was cut out and analyzed by 19F-NMR. As a result, the appearance of a new peak near −103 ppm was observed.

<Evaluation 2> Measurement of Contact Angle of Surface of Surface Layer

The measurement of a contact angle was performed using a mixed liquid for a wetting tension test having a wetting tension of 31.0 mN/m (product name: mixed liquid for a wetting tension test No. 31.0, produced by Wako Pure Chemical Industries, Ltd.).

<Evaluation 3> Measurement of Wear Depth of Surface Layer

The wear of the surface layer was evaluated as follows. That is, the produced fixing film was loaded as a fixing film of a color laser printer (product name: LBP5910, produced by Canon Inc.) equipped with the fixing apparatus having the structure illustrated in FIG. 2. To the color laser printer, 150000 sheets of A4 size plain paper (product name: CS-814, produced by Canon Inc.) were delivered in cross feed, and a line pattern of four colors, yellow, magenta, cyan and black, was printed on the plain paper. Thereafter, the wear depth of a part that had been brought into contact with both end portions of the plain paper in the longitudinal direction, on the surface of the surface layer, was measured. The reason why the wear depth of the part was measured was because the part corresponded to a part to be most worn out by friction with the end portions of the plain paper.

<Evaluation 4> Evaluation of Toner Release Properties

With respect to evaluation of toner release properties, the produced fixing film was incorporated into a fixing apparatus of a color laser printer (product name: LBP5910, produced by Canon Inc.). Then, the color laser printer was used to continuously output an electrophotographic image. An electrophotographic image was an image in which a line pattern of four colors, yellow, magenta, cyan and black, was formed on A4 size plain paper (product name: CS-814, produced by Canon Inc.). Then, the presence of toner offset on an electrophotographic image formed was visually observed, and the number of sheets when an electrophotographic image from which toner offset was observed was output for the first time was recorded.

In this regard, in the case where no electrophotographic image on which toner offset occurred was seen even if 150000 (150 K) sheets of electrophotographic images were continuously output, the formation of an electrophotographic image was finished at the time.

Example 2

A fixing film according to the present invention was produced in the same manner as in Example 1 except that the irradiation level of electron beam was changed to 400 kGy, and the film was subjected to Evaluation 1 to Evaluation 4.

Example 3

A fixing film according to the present invention was produced in the same manner as in Example 1 except that the irradiation level of electron beam was changed to 600 kGy, and the film was subjected to Evaluations 1 to 4.

Example 4

A fixing film according to the present invention was produced in the same manner as in Example 1 except that the temperature upon irradiation with electron beam was changed to 90° C., and the film was subjected to Evaluations 1 to 4.

Example 5

A fixing film according to the present invention was produced in the same manner as in Example 1 except that the temperature upon irradiation with electron beam was changed to 150° C., and the film was subjected to Evaluations 1 to 4.

Example 6

A fixing film according to the present invention was produced in the same manner as in Example 1 except that the temperature upon irradiation with electron beam was changed to 240° C., and the film was subjected to Evaluations 1 to 4.

Comparative Example 1

A fixing film according to the present invention was produced in the same manner as in Example 1 except that the temperature upon irradiation with electron beam was changed to 20° C., and the film was subjected to Evaluations 1 to 4.

Comparative Example 2

A stainless film having an outer diameter of 30 mm, a thickness of 40 μm, and a length in the axial direction of 400 mm was prepared as a base member of a fixing member.

An elastic layer having a thickness of 300 μm and made of a silicone rubber was formed on the stainless film. The surface of the elastic layer was treated with excimer UV, then uniformly spray-coated with a primer (product name: EK-1909S21L, produced by Daikin Industries, Ltd.) so that the thickness was 2 μm, and dried. A PFA coating material (product name: AW-5000L, produced by Daikin Industries, Ltd.) was uniformly spray-coated on the resultant film so that the thickness after firing was 25 μm, and then fired at 350° C. for 15 minutes to form a surface layer.

The thus obtained fixing film was uniformly irradiated with 100 kGy of electron beam under a nitrogen atmosphere (oxygen concentration: 1000 ppm or less) at 310° C. Reheating after irradiation was not performed in the present Comparative Example.

Comparative Example 3

A fixing film was produced in the same manner as in Comparative Example 1 except that the irradiation level of electron beam was changed to 200 kGy, and the film was subjected to Evaluations 1 to 4.

Comparative Example 4

A fixing film was produced in the same manner as in Comparative Example 1 except that the irradiation level of electron beam was changed to 400 kGy, and the film was subjected to Evaluations 1 to 2.

Comparative Example 5

A fixing film was produced in the same manner as in Comparative Example 1 except that the irradiation level of electron beam was changed to 600 kGy, and the film was subjected to Evaluations 1 to 2.

Comparative Example 6

A stainless film having an outer diameter of 30 mm, a thickness of 40 μm, and a length in the axial direction of 400 mm was prepared as a base member of a fixing member.

An elastic layer having a thickness of 300 μm and made of a silicone rubber was formed on the stainless film. The surface of the elastic layer was treated with excimer UV, then uniformly spray-coated with a primer (product name: EK-1909S21L, produced by Daikin Industries, Ltd.) so that the thickness was 2 μm, and dried. A PFA coating material (product name: AW-5000L, produced by Daikin Industries, Ltd.) was uniformly spray-coated on the resultant film so that the thickness after firing was 30 μm, and then fired at 350° C. for 15 minutes to form a surface layer to produce a fixing film, and the film was subjected to Evaluations 1 to 4. That is, in the present Comparative Example, neither irradiation with electron beam nor heating of the PFA resin film after irradiation with electron beam was performed.

With respect to the Examples 1 to 6 and Comparative Examples 1 to 6, the results of Evaluations 1 to 4 are shown in the following Table 1.

Herein, the fixing films according to the Comparative Examples 4 and 5 were not subjected to Evaluation 3 and Evaluation 4.

One reason for this is as follows: with respect to the wear depth according to Evaluation 3, the wear depths of the fixing films according to Comparative Example 4 and Comparative Example 5 can be presumed to be comparable with the wear depth of the fixing film according to Example 4.

In addition, another reason is as follows: with respect to toner release properties according to Evaluation 4, the contact angle of the surface of each of the fixing films according to Comparative Example 4 and Comparative Example 5 is smaller than the contact angle of the surface of each of the fixing films according to Comparative Example 2 and Comparative Example 3. This reveals that the toner release properties of the fixing films according to Comparative Example 4 and Comparative Example 5 are inferior as compared with the toner release properties of the fixing films according to Comparative Example 2 and Comparative Example 3.

TABLE 1

| | Irradiation level of electron beam (kGy) | Temperature upon irradiation (° C.) | Presence of reheating after irradiation with electron beam | Evaluation 1 Presence of crosslinking point peak | Evaluation 2 Contact angle (°) | Evaluation 3 Wear depth (mm) | Evaluation 4 Toner release properties (sheet) |
|---|---|---|---|---|---|---|---|
| Example 1 | 200 | 310 | Presence | Presence | 68 | 0 | 150000 |
| Example 2 | 400 | 310 | Presence | Presence | 67 | 0 | 150000 |

TABLE 1-continued

| | Irradiation level of electron beam (kGy) | Temperature upon irradiation (° C.) | Presence of reheating after irradiation with electron beam | Evaluation results | | | |
|---|---|---|---|---|---|---|---|
| | | | | Evaluation 1 Presence of crosslinking point peak | Evaluation 2 Contact angle (°) | Evaluation 3 Wear depth (mm) | Evaluation 4 Toner release properties (sheet) |
| Example 3 | 600 | 310 | Presence | Presence | 69 | 0 | 150000 |
| Example 4 | 200 | 90 | Presence | Presence | 72 | 0 | 150000 |
| Example 5 | 200 | 150 | Presence | Presence | 73 | 0 | 150000 |
| Example 6 | 200 | 240 | Presence | Presence | 73 | 0 | 150000 |
| Comparative Example 1 | 200 | 20 | Presence | Absence | 71 | 4.9 | 150000 |
| Comparative Example 2 | 100 | 310 | Absence | Presence | 65 | 2.1 | 82000 |
| Comparative Example 3 | 200 | 310 | Absence | Presence | 63 | 0 | 63000 |
| Comparative Example 4 | 400 | 310 | Absence | Presence | 59 | — | — |
| Comparative Example 5 | 600 | 310 | Absence | Presence | 58 | — | — |
| Comparative Example 6 | — | — | Absence | Absence | 69 | 5.3 | 150000 |

It is found from the results of Evaluation 2 that the contact angle of each of Comparative Examples 3 to 5 in which irradiation with electron beam is performed is lowered as the increase in irradiation level of electron beam, relative to the contact angle of Comparative Example 6 in which irradiation with electron beam is not performed. On the contrary, it can be seen that the contact angle value of each of Examples 1 to 3 in which reheating is performed is recovered near the value of Comparative Example 6.

In addition, it could be confirmed from the results of Evaluation 3 that, with respect to Examples 1 to 6, almost no wearing was observed even after 150000 (150K) sheets were delivered and the wear resistance of the surface layer was enhanced by crosslinking of PFA, as compared with the case of Comparative Example 6.

Furthermore, with respect to Evaluation 4, no toner offset was observed in Examples 1 to 6 and Comparative Example 1 in which the contact angle was 67° or more even after 150000 (150 K) sheets were delivered, as shown in "toner release properties (sheet)" column of Table 1. On the other hand, toner offset occurred in Comparative Examples 2 and 3, in which the contact angle was less than 67°, in the electrophotographic image of the 82000th (82 K) sheet and the electrophotographic image of the 63000th (63 K) sheet, respectively.

In addition, it is found from comparison of Examples 1, 4 to 6 and Comparative Example 1 that even if the temperature of the film containing uncrosslinked PFA upon irradiation with electron beam is 90° C. (the glass transition point of uncrosslinked PFA) or higher, PFA is crosslinked to enhance the wear resistance of the surface layer.

Furthermore, according to comparison among Examples 1, 4 to 6, the contact angle of each of Examples 4 to 6, in which the temperature of the film containing uncrosslinked PFA upon irradiation with electron beam is within the range of the glass transition point (Tg) of uncrosslinked PFA or higher and a temperature lower than the melting point of uncrosslinked PFA by 60° C. (Tm−60° C.) or lower, is larger than the contact angle of Example 1 in which the temperature of the film containing uncrosslinked PFA upon irradiation with electron beam is 310° C. in the vicinity of the melting point of uncrosslinked PFA. That is, it is considered that the surface of each of the fixing films according to Examples 4 to 6 has more enhanced toner release properties. The crosslinking in the vicinity of the melting point of uncrosslinked PFA allows crystals to be melted to cause molecular chain cleavage, crosslinking and rearrangement, thereby resulting in the reduction in crystallinity of PFA after the crosslinking. On the contrary, it is considered that the crosslinking of uncrosslinked PFA, in which the temperature was adjusted within the range of the glass transition point (Tg) of uncrosslinked PFA or higher and a temperature lower than the melting point of uncrosslinked PFA by 60° C. (Tm−60° C.) or lower, allows molecular chain cleavage, crosslinking and rearrangement to occur at a flexible amorphous part while a crystalline part being maintained, thereby resulting in the increase in crystallinity and the rise in contact angle value.

It is found from the results that uncrosslinked PFA was irradiated with electron beam in the absence of oxygen within the temperature range of the glass transition point of uncrosslinked PFA or higher and the vicinity of the melting point of uncrosslinked PFA or lower, to form PFA having a crosslinked structure, thereby enhancing wear resistance. The presence of the crosslinked structure can be confirmed by a peak near −103 ppm observed by 19F-NMR. In addition, while the deterioration in release properties due to irradiation with electron beam was observed, the release properties were recovered by reheating and the enhanced wear resistance was also kept. The contact angle required in this time was found to be 67° or more by using a mixed liquid for a wetting tension test having a wetting tension of 31.0 mN/m. In addition, it was found with respect to conditions for achieving particularly good release properties that the temperature upon irradiation with electron beam could be within the range of the glass transition point (Tg) of uncrosslinked PFA or higher and a temperature lower than the melting point of uncrosslinked PFA by 60° C. (Tm−60° C.) or lower.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-172116, filed Aug. 2, 2012, and Japanese Patent Application No. 2013-124881, filed Jun. 13, 2013, which are hereby incorporated by reference herein in their entirety.

What is claimed is:

1. A fixing member comprising:
a base member;
an elastic layer provided on a surface of the base member; and
a surface layer,
wherein the surface layer contains a tetrafluoroethylene-perfluoroalkyl vinyl ether copolymer having a partial structure represented by structural formula (1):

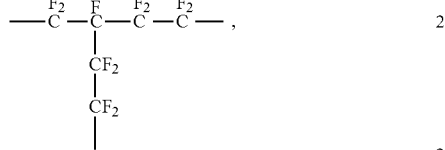

and
wherein the surface layer has a surface having a contact angle of 67 degrees or more as measured in a mixed liquid for a wetting tension test having a wetting tension of 31.0 mN/m.

2. The fixing member according to claim 1, wherein the surface layer is manufactured by irradiating a layer containing a tetrafluoroethylene-perfluoroalkyl vinyl ether copolymer with ionizing radiation in an absence of oxygen at a temperature from the glass transition temperature (Tg) of the tetrafluoroethylene-perfluoroalkyl vinyl ether copolymer to a temperature that is higher than a melting point (Tm) of the tetrafluoroethylene-perfluoroalkyl vinyl ether copolymer by 30° C., (Tm+30° C.), to form a layer containing a tetrafluoroethylene-perfluoroalkyl vinyl ether copolymer having a partial structure represented by the structural formula (1), and thereafter heating the irradiated layer containing the tetrafluoroethylene-perfluoroalkyl vinyl ether copolymer having the partial structure represented by the structural formula (1) at a temperature from 340° C. to 380° C.

3. The fixing member according to claim 1, wherein the elastic layer contains a silicone rubber.

4. The fixing member according to claim 1, wherein the base member contains at least one resin selected from the group consisting of polyimide, polyamidimide and polyethersulfone.

5. The fixing member according to claim 1, wherein the base member contains nickel or stainless steel.

6. The fixing member according to claim 1, wherein a thickness of the base member is 20 to 60 μm.

7. A fixing apparatus comprising the fixing member according to claim 1, a heating device for heating the fixing member, and a pressure member arranged opposite to the fixing member.

8. An image forming apparatus comprising the fixing apparatus according to claim 7.

9. A method for manufacturing a fixing member which comprises:
a base member;
an elastic layer provided on a surface of the base member; and
a surface layer containing a tetrafluoroethylene-perfluoroalkyl vinyl ether copolymer having a partial structure represented by structural formula (1):

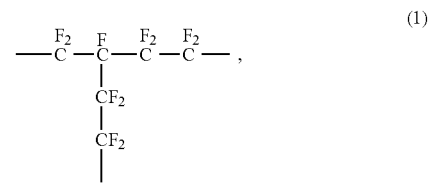

the method comprising a step of forming the surface layer by steps (1) to (3):
(1) adjusting a temperature of a film containing an uncrosslinked tetrafluoroethylene-perfluoroalkyl vinyl ether copolymer, formed on a surface of the elastic layer, to a temperature from the glass transition temperature (Tg) of the tetrafluoroethylene-perfluoroalkyl vinyl ether copolymer to a temperature that is higher than a melting point (Tm) of the tetrafluoroethylene-perfluoroalkyl vinyl ether copolymer by 30° C., (Tm+30° C.);
(2) irradiating a surface of the film containing the tetrafluoroethylene-perfluoroalkyl vinyl ether copolymer, the temperature of which was adjusted in the step (1), with ionizing radiation under an atmosphere having an oxygen concentration of 1000 ppm or less to form the partial structure represented by the structural formula (1) in the tetrafluoroethylene-perfluoroalkyl vinyl ether copolymer; and
(3) after the irradiating, adjusting the temperature of the film containing the tetrafluoroethylene-perfluoroalkyl vinyl ether copolymer having the partial structure represented by the structural formula (1), resulting from the step (2), to a temperature from 340° C. to 380° C.

10. The method according to claim 9, wherein, in the step (1), the temperature is adjusted to be from Tg to Tm−60° C.

11. The method according to claim 9, wherein, in the step (3), the temperature of the film containing the tetrafluoroethylene-perfluoroalkyl vinyl ether copolymer having the partial structure represented by the structural formula (1) is maintained at 340° C. to 380° C. for a period of at least 5 minutes.

12. The method according to claim 11, wherein the period is from 10 minutes to 20 minutes.

13. The method according to claim 9, wherein the film containing the uncrosslinked tetrafluoroethylene-perfluoroalkyl vinyl ether copolymer in the step (1) is formed by applying a dispersion in which particles made of uncrosslinked tetrafluoroethylene-perfluoroalkyl vinyl ether copolymer are colloidally dispersed in an aqueous solvent on the surface of the elastic layer, and then adjusting a temperature of a coating film of the dispersion to a melting point of uncrosslinked tetrafluoroethylene-perfluoroalkyl vinyl ether copolymer or higher to melt the uncrosslinked tetrafluoroethylene-perfluoroalkyl vinyl ether copolymer.

14. The method according to claim 9, wherein the film containing the uncrosslinked tetrafluoroethylene-perfluoroalkyl vinyl ether copolymer in the step (1) is formed by allowing a powder coating material made of the uncrosslinked tetrafluoroethylene-perfluoroalkyl vinyl ether copolymer to adhere to the surface of the elastic layer by electrostatic painting, and then adjusting a temperature of a coating film of the powder coating material to a melting point of uncrosslinked tetrafluoroethylene-perfluoroalkyl vinyl ether copolymer or higher to melt the uncrosslinked tetrafluoroethylene-perfluoroalkyl vinyl ether copolymer.

15. The method according to claim 9, wherein the film containing the uncrosslinked tetrafluoroethylene-perfluoroalkyl vinyl ether copolymer in the step (1) is formed by covering a circumference of the elastic layer with an uncrosslinked tetrafluoroethylene-perfluoroalkyl vinyl ether copolymer tube.

* * * * *